US 6,708,942 B2

(12) United States Patent
Barkan

(10) Patent No.: US 6,708,942 B2
(45) Date of Patent: Mar. 23, 2004

(54) SECURITY BUCKLE FOR HARNESSING DISPLAY SETS

(76) Inventor: Lior Barkan, 39A Kehilat Sophia St., Tel Baruch, Tel Aviv 69018 (IL)

( * ) Notice: Subject to any disclaimer, the term of this patent is extended or adjusted under 35 U.S.C. 154(b) by 0 days.

(21) Appl. No.: 10/109,658

(22) Filed: Apr. 1, 2002

(65) Prior Publication Data
US 2002/0166940 A1 Nov. 14, 2002

(30) Foreign Application Priority Data
May 8, 2001 (IL) ................................................. 143042

(51) Int. Cl.⁷ .................................................. F16M 1/00
(52) U.S. Cl. ........................................ 248/500; 24/323
(58) Field of Search ............................... 248/551, 67.1, 248/316.7, 500, 505; 24/295, 458, 455, 459, 293, 322.1, 323, 324

(56) References Cited

U.S. PATENT DOCUMENTS

| 3,774,269 A | * | 11/1973 | Campbell | 191/40 |
| 4,169,641 A | * | 10/1979 | Olsson | 439/493 |
| 4,440,374 A | * | 4/1984 | Achille | 248/544 |
| 4,520,979 A | * | 6/1985 | McInnis | 248/323 |
| 4,538,875 A | * | 9/1985 | Krenz | 439/470 |
| 4,635,886 A | * | 1/1987 | Santucci et al. | 248/73 |
| 4,865,281 A | * | 9/1989 | Wollar | 248/71 |
| 5,024,405 A | * | 6/1991 | McGuire | 248/73 |
| 5,127,617 A | | 7/1992 | Bergetz | 248/278.1 |
| 5,393,025 A | | 2/1995 | Franklin | 248/317 |
| 5,927,666 A | | 7/1999 | Barkan | 248/225 |
| 6,000,560 A | | 12/1999 | Barkan | 211/96 |
| 6,097,448 A | | 8/2000 | Perkins | 348/837 |
| 6,243,928 B1 | * | 6/2001 | Powell | 24/458 |
| 6,502,283 B1 | * | 1/2003 | Aguirre | 24/3.11 |

FOREIGN PATENT DOCUMENTS

GB          2 195 700 A      *    4/1988

* cited by examiner

Primary Examiner—Ramon O Ramirez
Assistant Examiner—Kofi Schutterbrandt
(74) Attorney, Agent, or Firm—Blank Rome LLP

(57) ABSTRACT

A security buckle for allowing a firm grip of a displaying device by a safety strap. The security buckle is anchored into a ventilation slit, thus preventing the strap from sliding. The security buckle comprises: an elongated member, a tooth protruding from one end of the elongated member and an arm for securing the strap onto the upper surface of the elongated member. Preferably the buckle is fabricated from a nonconductive plastic material.

12 Claims, 5 Drawing Sheets

SECURITY BUCKLE FOR HARNESSING DISPLAY SETS

BACKGROUND OF THE INVENTION

1. Field of the Invention

The present invention generally relates to safety means for securing displays such as television sets and similar displays to their support. More specifically, the present invention relates to a security buckle engaged into ventilation slits for secure harnessing of such devices by a safety belt.

2. Discussion of the Related Art

Currently, most television sets and other display sets such as computer screens are constructed such that the frontal glass screen consists about 70% of the television weight, resulting in a gravity center very close to the front, about 10 cm behind the screen. The uneven weight distribution makes such display sets highly susceptible to losing equilibrium and turning over or sliding forwardly, upon small shifts or forces. When a television set is positioned on a support, such a chest, a cabinet or a shelf, its center of gravity is located above the supportive surface. However, since the center of gravity is very close to the front, a small shift in the forward direction, might cause the center of gravity to move outside the supportive surface, leading to the set falling. Similarly, a small forward inclination of the television set might cause the set to turn over and fall. Thus, in general, due to their inherent unstability, television sets and similar display devices are associated with a safety hazard. This is particularly important when television sets are placed at relatively exposed positions where they can be easily bumped into and most importantly when they are located within reach of children which might, unintentionally or out of curiosity, push or pull the television. In particular relevant to the present invention are television sets, or other displays and monitors, which are mounted on wall or ceiling mounting assemblies. Such mounting assemblies usually comprise a wall (or ceiling) bracket, an arm attached to said bracket and a support tray attached to said arm on which the television or display is positioned. Usually the mounting assemblies further comprise various pivoting means for allowing the viewer to adjust the positioning of the screen to his convenience. In such mounting assemblies, it is particularly important to provide safety means for stabilizing the display and securing it to its tray for preventing possible falling upon adjustment of the arm or unintentional bumping into the assembly. Indeed, most mounting assemblies are provided with some securing means for avoiding undesired displacements of the set relative to the supporting tray. These means include safety belts, embracing frames and permanent means such as threading metal screws at the television bottom. Indeed, mounted assemblies for television sets and the like, are often provided with openings at the tray sides for attaching support frame or for insertion of a safety strap. These securing means, however, suffer from a number of drawbacks. Permanent securing by screws and bolts require changes in the television set (or display) itself makes installation and future dismantling cumbersome. Furthermore, it may present a danger of electrical shock. Embracing frames are cumbersome, unaesthetic, hard to install and quite expensive, often more expensive than the arm itself. Safety belts, on the other hand, which are the simplest and least expensive securing means, therefore the most wide spread solution, usually fail to truly fulfil their function due to the structure of television sets. Most television sets (and other displaying devices) are built such that there is a relatively small portion of flat area around the screen while the greater part of the cabinet profile is slopped toward the rear (see for example FIG. 4). This structure makes it difficult to obtain a firm grip of the cabinet by a safety strap. A safety strap wrapped around the cabinet main body tends to slide backward, losing hold of the set and making it useless. On the other hand, wrapping the strap around the frontal flat portion of a television set is not of much use either. In order to cancel the moment formed by gravitation, an opposite moment of sufficient magnitude must be exerted on the set. When the strap is placed in the frontal part, the distance between the line of force formed by the strap and the axis of rotation (i.e., extreme point of the television basis or leg) is not sufficient to cancel the gravity moment around this axis. In other words, in order to cancel the moment which is formed by the action of gravity when the television is inclined forwardly, the strap must be placed as far as possible from the front. But as explained above, wrapping a strap around the rear portion of a television set is impractical because of its slope.

Accordingly, it is the object of the present invention to provide security means for enabling a firm grip of a television set and the like by a harnessing strap wrapped around the main body of the device.

It is another object of the present invention to provide such means which is low-cost, aesthetic, simple to install, and does not require any changes to be made neither in the television set nor in said safety strap.

SUMMARY OF THE INVENTION

In accordance with the present invention, there is thus provided a security buckle for providing a firm grip of a displaying device, such as a television set, by a safety harnessing strap which is wrapped around the main body of the device. The security buckle of the present invention is inserted into a ventilation slit of the displaying device, thus preventing the strap from sliding backward and losing hold of the device. The security buckle comprises an elongated member having a bottom flat surface and an upper opposite surface; a tooth protruding from the bottom flat surface at one end of the elongated member, and a stopping means for securing the strap onto the upper surface of the elongated member and for preventing the strap from sliding. The tooth is inserted into a ventilation slit of the displaying device and the strap is placed transverse of to the elongated member.

According to one embodiment of the present invention, the stopping means for securing the strap onto the upper surface of the elongated member is an arm protruding in an opposite direction to the tooth which forms a right or acute angle with the elongated member. Preferably the buckle comprises two arms protruding from both ends of the elongated member in an opposite direction to the tooth, wherein the arms are bent toward each other, forming an opening between the upper surface of the elongated member and between the arms, for accommodating the strap. The arms can form a closed loop. The buckle is fabricated from nonconductive plastic, preferably from acetal or polyamid polymers.

In accordance with one embodiment of the present invention the buckles are fabricated as a pair of buckles connected by a thin cord wherein the pair and the cord are fabricated as one piece.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

The present invention provides means for enabling a firm grip of television sets, displays and monitors and the like by a safety strap.

Most television sets and other similar display and monitor devices are provided with ventilation slits either at the upper wall or at the side walls of their cabinet. The ventilation slits are necessary for allowing the heat which develops inside the device to dissipate to surrounding, in order to avoid high temperatures which might hinder proper functionality of the instrument. The present invention exploits this common feature (i.e., ventilation slits) for providing a method for harnessing a displaying device by a harnessing safety strap. The method of the present invention comprising providing a security buckle having a tooth and a stopping means for preventing the safety strap from sliding, inserting said tooth into a ventilation slit of said displaying device and placing said strap transversely to said buckle.

Figure 1A:
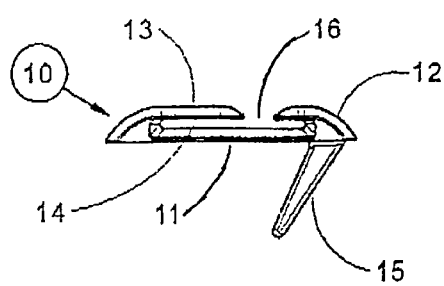
FIG. 1 give a side view (FIG. 1a) and a frontal view (FIG. 1B) of a security buckle in accordance with a preferred embodiment of the present invention.
Figure 1B:
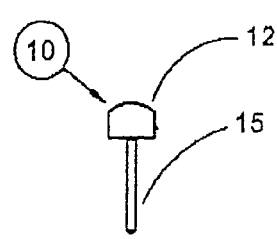

FIG. 1 show a securing buckle, designated 10, in accordance with a preferred embodiment of the present invention. Security buckle 10 comprises an elongated flat member 11 and a tooth 15 protruding from one end of said flat member, forming an acute angle with member 11. Preferably tooth 15 is a triangular shaped flat member. Two arms, 12 and 13, protruding from the other surface of member 11, in opposite direction to tooth 15, are bent inwardly toward each other forming opening 14 for accommodating a strap. Arms 12 and 13 are preferably separated by space 16 for allowing insertion of the strap into opening 14 when both ends of the strap are not free. Opening 16 is narrower than the strap width for preventing the strap from unintentional release. Alternatively, when at least one of the strap ends is free, the strap can be threaded directly through opening 14, thereby arms 12 and 13 can be connected to form a closed loop.

It will be appreciated by the present invention that elongated member 11 is a keel-like element from which the other components of the buckle extend. Thus in the context of the present invention the term "elongated" relates to the buckle dimension relevant to the present invention i.e., the line connecting between the tooth protruding in one direction and the stopping means protruding to the opposite direction. However, it will be easily appreciated that member 11 can extends laterally such that it can assume any substantially flat form.

Figure 2A:
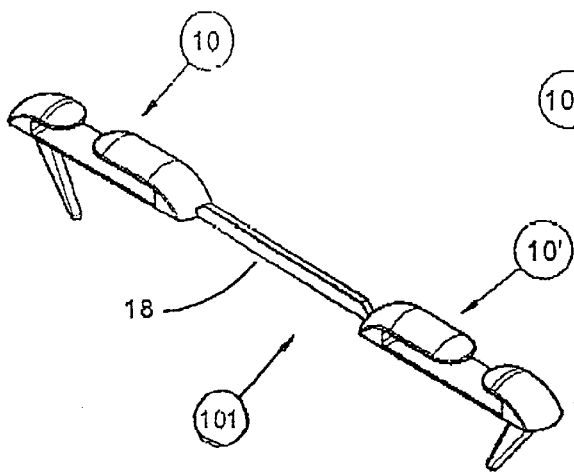
FIG. 2 depict a buckles pair in accordance with a preferred embodiment of the present invention.
Figure 2B:
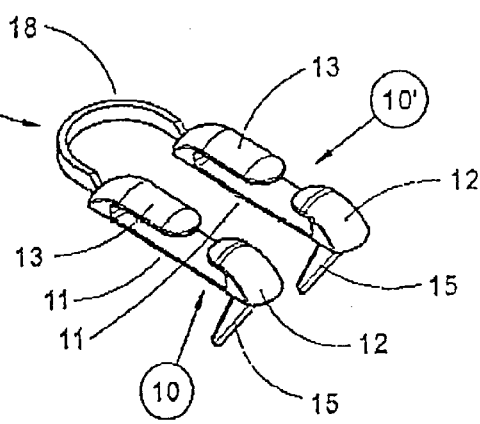

In accordance with a preferred embodiment of the present invention, buckle 10 is fabricated in pairs as shown in FIG. 2. According to this embodiment, two identical buckles 10 and 10', designated collectively as 101, are connected by a thin cord 18, wherein the pair, including connected cord 18, can be fabricated as a one piece and be supplied for use as such. Cord 18 is fabricated to be thin enough such that it can be easily cut (by scissors, for instance) for using the buckles separately.

Preferably, the buckle of the present invention is fabricated from nonconductive plastic material. More preferably buckle 10 is made by injection molding of thermoplastic polymers such as acetal copolymers and polyamides. These materials are resilient and have high bending and stretching strengths, allowing buckle 10 to absorb forces without breaking.

Figure 3:
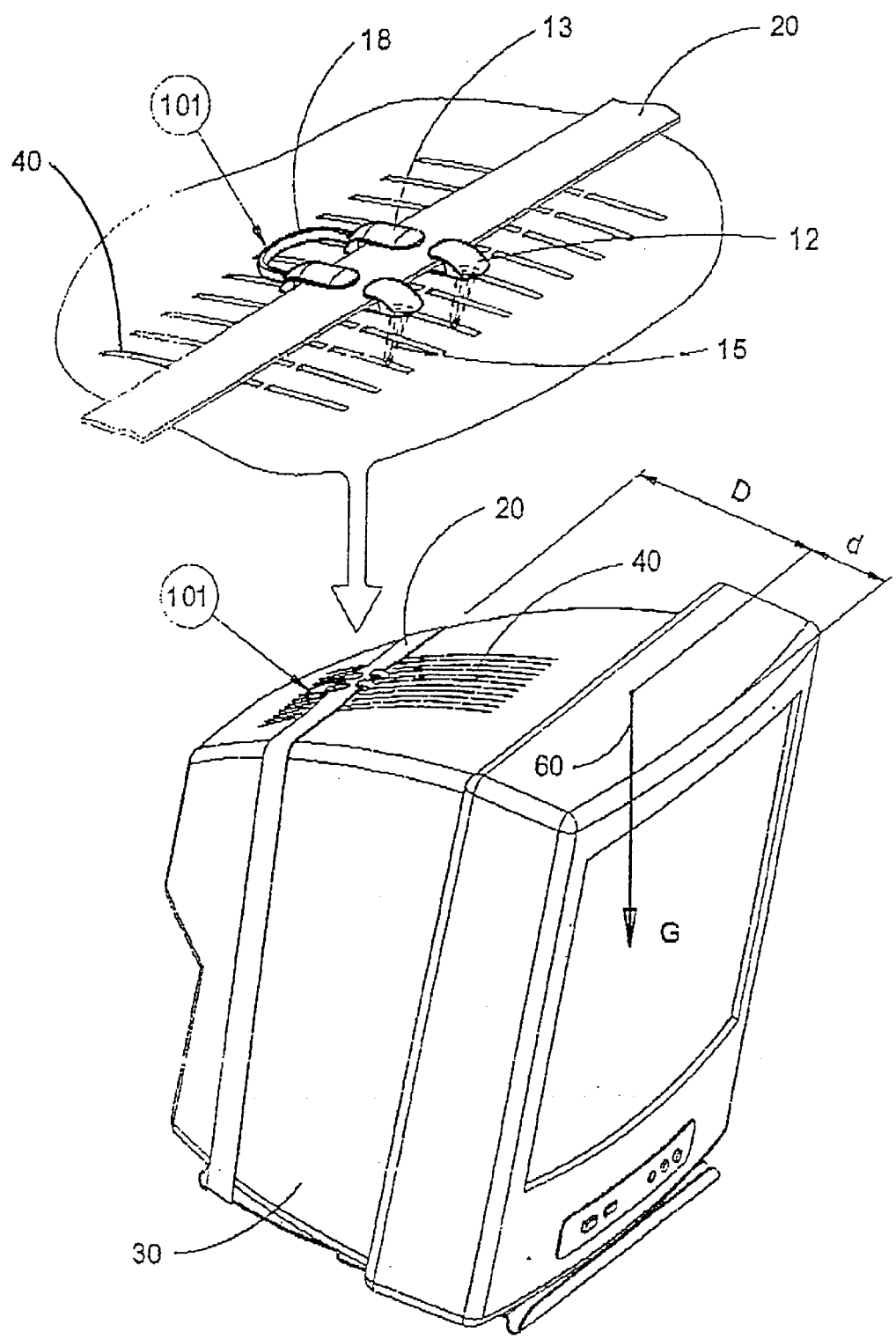
FIG. 3 depicts the use of a buckle pair of the present invention for television set or other displaying devices having ventilation slits at the top.
Figure 4:
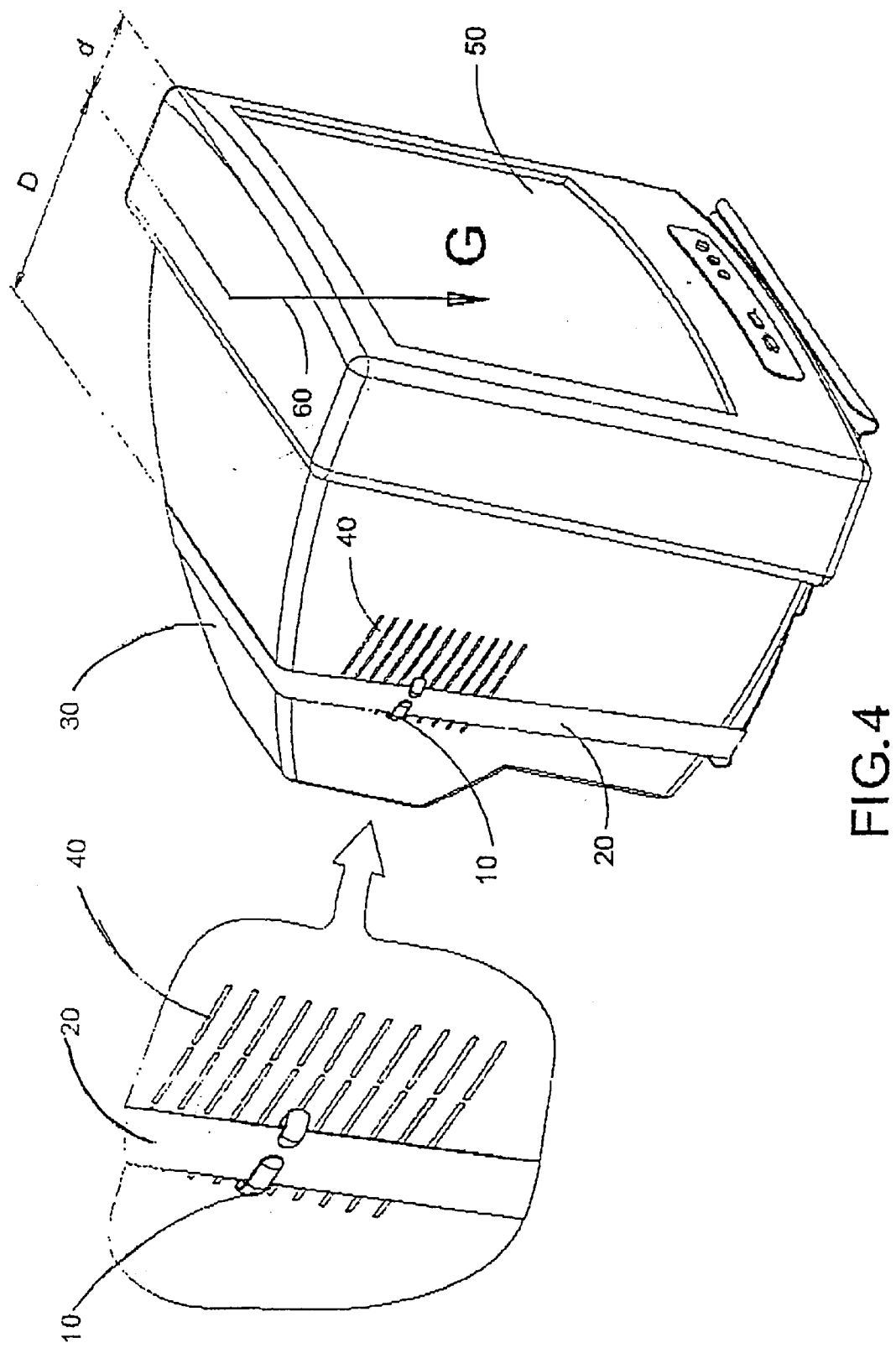
FIG. 4 depicts the use of a buckle of the present invention for television set or other displaying devices having side ventilation slits.

FIGS. 3 and 4 demonstrate the use of buckle 10 or buckle pair 101 for providing a firm grip of a television set (and other similar display devices) by a safety harnessing strap, designated 20. FIG. 3 depicts a television cabinet, designated 30, having parallel ventilation slits 40, at its top wall. FIG. 4 depicts a similar device having parallel ventilation slits 40 at its side walls. As can be seen in the insertions of FIGS. 3 and 4, ventilation slits 40 are divided along their length into smaller sections in order to avoid construction weakness. The sectioning is usually achieved by lying transverse cantilevered strips below the slits. For the purpose of the present invention, the narrow back ends of these sections provide stopping means for anchoring buckle 10 and for preventing it from sliding in the backward direction. Also shown in FIGS. 3 and 4 is the gravitation vector G, designated 60, which passes through the center of mass at a distance d behind the screen. According to the present invention, strap 20 can be wrapped around set 30 at a distance D from the set center of mass, which is big enough to form an effective opposite momentum which will cancel the momentum caused by the gravitation force.

FIG. 3 shows a television set comprising a screen 50 and a cabinet with ventilation slits 40 at its top wall. For television sets having top ventilation slits it is best to use a connected pair of buckles 101 in order to divide the force exerted by the strap tension between the two buckles. Teeth 15's are inserted into adjacent or near adjacent slits 40 (as best shown by expanded view of FIG. 3) and are pressed against the slits edges. Strap 20 is inserted into openings 14 of buckles 10 and 10' enforcing the buckles in their place. Thus, the force exerted by the tension in strap 20 prevents teeth 15 from being released from slits 40 while teeth 15 prevent buckles 10 and consequently strap 20 from sliding down the slopped wall.

FIG. 4 illustrates the use of buckle 10 for television sets having ventilation slits at their side walls. In such a case, it is best to use two separate buckles, each inserted at one of the two side walls. For best performance, the buckles should be inserted into symmetrical mirrored slits in order to equally divide the force exerted by strap 20 between the two buckles.

Although FIGS. 3 and 4 demonstrate the use of two identical buckles, it will be easily appreciated that any number of buckles can be used in accordance with the present invention. Thus, it is possible to use only one buckle or, on the other hand, to use more than two buckles in order to divide the force between more than two buckles.

Figure 5:
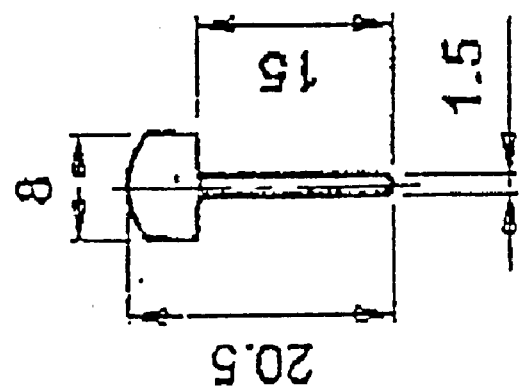
FIG. 5 gives typical dimensions (in mm units) of a buckle in accordance with the preferred embodiment of FIG. 1.
Figure 5:
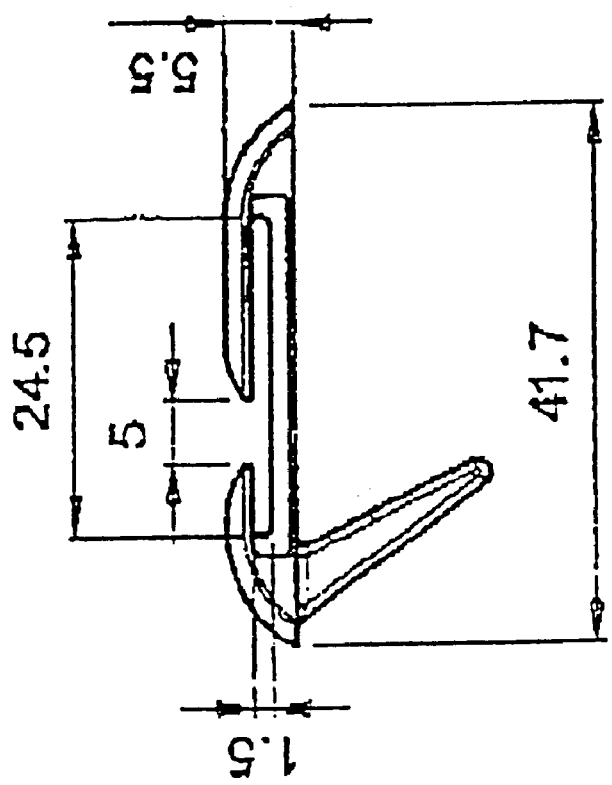

Typical dimensions (in mm units) of buckle 10 for use with a typical strap of about 25 mm width are shown in FIG. 5. It will be easily appreciated that the dimensions shown are not limiting in any way and are given only as an example for illustration and clarification sake. The buckle or buckles pair of the present invention can be fabricated at various sizes in accordance with the strap dimension and the ventilation slits dimension.

It will be also easily appreciated by persons skilled in the art that the present invention is not limited to the embodiment shown in FIGS. 1 to 5 and that other embodiments of buckle 10 are possible without departing from the scope of the present invention. FIGS. 6A to 6D give some examples of such alternatives embodiments of buckle 10. Common to all embodiments is member 11 having at least one flat surface (11a) to be placed in contact with the displaying device; a tooth 15 to be inserted into a ventilation slit of said device; and stopping means for preventing strap 20 from sliding backward when placed transversely onto the opposite surface (11b) of member 11, when the strap is wrapped around the device. Also the embodiments depicted in FIG. 6 can be fabricated as buckle pairs in a similar manner to what has been described in FIG. 2.

Figure 6A:
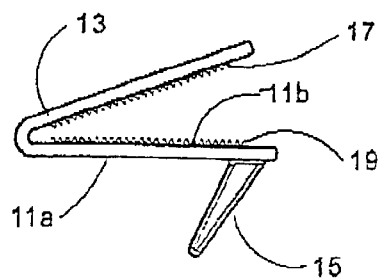
FIGS. 6A to 6D show alternative embodiments of the security buckle of the present invention.
Figure 6B:
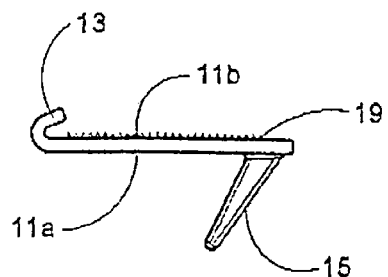
Figure 6C:
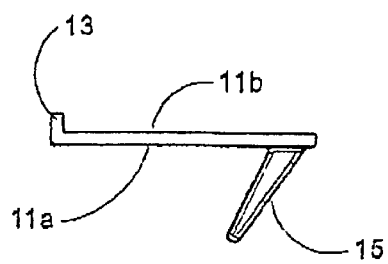
Figure 6D:
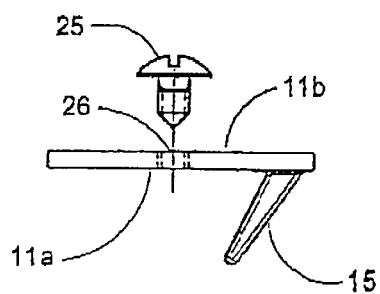

FIG. 6A depicts a buckle having one arm protruding from member 11 in the opposite direction to tooth 15, forming an acute angle with member 15. The strap is inserted in between member 11 and arm 13 such that when tooth 15 is inserted in a ventilation slit of a displaying device, arm 13 prevents it from sliding backward. The buckle is also provided with small teeth-like projections 19 and 17 on the upper surface of member 11 and the bottom surface of arm 13 for enhancing the grip the buckle on the strap and preventing the strap from moving. According to one version of the buckle described in FIG. 6A, arm 13 can be bent toward member 11 and be locked to member 11 by means of projections 17 and 19. FIGS. 6B and 6C depict embodiments in which arm 13 is much smaller and can be either slightly bent inwardly (as in FIG. 6B) or just forming a right angle with member 11 (as in FIG. 6C). In either case arm 13 being a stopping means for preventing the strap from sliding backward. FIG. 6D depicts yet another embodiment in which the safety strap is attached to the upper surface (11b) of member 11 by means of a screw 25 which is inserted through the strap and threaded into a suitable recess 26 in member 11.

It will be appreciated by persons skilled in the art that the present invention is not limited to what has been particularly shown and described hereinabove. Rather the scope of the present invention is defined only by the claims which follow.

What is claimed is:

1. A security buckle associated with a safety harnessing strap for providing a firm grip of a displaying device by said strap and for preventing said strap from sliding, said security buckle comprising:

two security buckles connected by a thin cord and wherein said two security buckles and said cord are fabricated as a one piece;

wherein each security buckle includes an elongated element having a bottom flat surface and an upper opposite surfaces, a tooth protruding from the bottom flat surface at one end of the elongated element forming a pointed acute angle with the elongated element, the tooth being inserted into a ventilation slit of the displaying device for anchoring the buckle into the displaying devices, and a stopping means for securing the strap onto the upper surface of the elongated element and for preventing the strap from sliding, the strap being placed transverse to the elongated element.

2. The security buckle of claim 1 wherein said displaying device is a television set.

3. The security buckle of claim 1 wherein the stopping means for securing the strap onto the upper surface of the elongated element is an arm protruding from the second end of the elongated element in an opposite direction to the tooth, the arm forming a right or acute angle wit the elongated element.

4. The security buckle of claim 3 wherein the buckle further comprises a second arm protruding from the same end as the tooth, in a direction opposite to the tooth and wherein the two arms are bent inwardly toward each other to form an opening between the upper surface of the elongated element and between the arms, to accommodate the strap.

5. The security buckle of claim 1 wherein the stopping means for securing the strap onto the upper surface of the elongated element is a screw to be inserted through the strap and wherein the upper surface elongated element is having a recess for threading the screw into said elongated element.

6. The security buckle of claim 1 wherein the upper surface of the elongated element is having a tooth-like projections for enhancing the grip of the strap.

7. The security buckle of claim 1 fabricated from nonconductive plastic.

8. The security buckle of claim 7 wherein the nonconductive plastic is fabricated from the group consisting of acetal copolymers and polyamid polymers.

9. A security buckle associated with a safety harnessing strap for providing a firm grip of a displaying device by said strap and for preventing said strap from sliding, said security buckle comprising two security buckles connected by a thin cord and wherein said two security buckles and said cord are fabricated as a one piece, each security buckle including an elongated loop having an elongated opening for accommodating the strap and a tooth protruding from the loop to be inserted into a ventilation slit of the displaying device for anchoring the buckle onto the displaying device.

10. The security buckle of claim 9 wherein the loop is an open loop having two unconnected ends for inserting the strap into the elongated opening.

11. A method for harnessing a displaying device to a supporting surface by a harnessing safety strap, the method comprising providing a nonconductive buckle having a tooth and a stopping means for preventing the safety strap from sliding, inserting said tooth into a ventilation slit of said displaying device and placing said strap transversely to said buckle.

12. The method of claim 11, wherein the displaying device is a television set.

* * * * *